Dec. 28, 1965   E. C. EBERLE   3,226,162
WATERPROOF SEALING MEANS
Filed July 20, 1964

INVENTOR
Eugene C. Eberle
BY
ATTORNEY

United States Patent Office 3,226,162
Patented Dec. 28, 1965

3,226,162
WATERPROOF SEALING MEANS
Eugene C. Eberle, El Cajon, Calif., assignor of one-half to Jack Britton Stevens
Filed July 20, 1964, Ser. No. 383,742
3 Claims. (Cl. 301—108)

This invention relates to waterproof sealing means for vehicle hubs such as used on boat trailers or the like and which are submerged temporarily for the purpose of unloading or loading a boat.

An object of my invention is to provide a more effective means of protecting the wheel hub bearings against coming in contact with water, and particularly salt water, whereby corrosion and damage to the same is prevented.

A further object of my invention is to provide sealing means whereby a differential air pressure between the interior and exterior of the hub positively prevents the ingress of water or other substances to the interior of the wheel hub.

A still further object of my invention is to provide a waterproof sealing means which acts in part as a signal means allowing one to be advised when said waterproof sealing means is properly functioning.

A still further object of my invention is to provide a novel means for the introduction of air under pressure into the interior of said wheel hub and preventing the intrusion of water or other substances into the interior of said hub.

A still further object of my invention is to provide a novel waterproof sealing means for vehicle hubs or the like which can be easily mounted on a conventional hub and axle and which is simple in construction and inexpensive to manufacture and use.

Other objects, advantages and features of my invention will appear from the accompanying drawing and the detailed description and appended claims.

Figure 1:
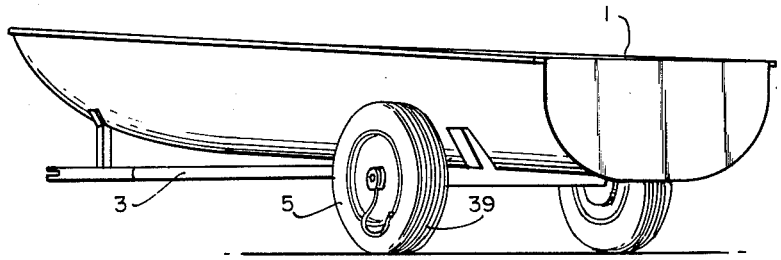
Figure 2:
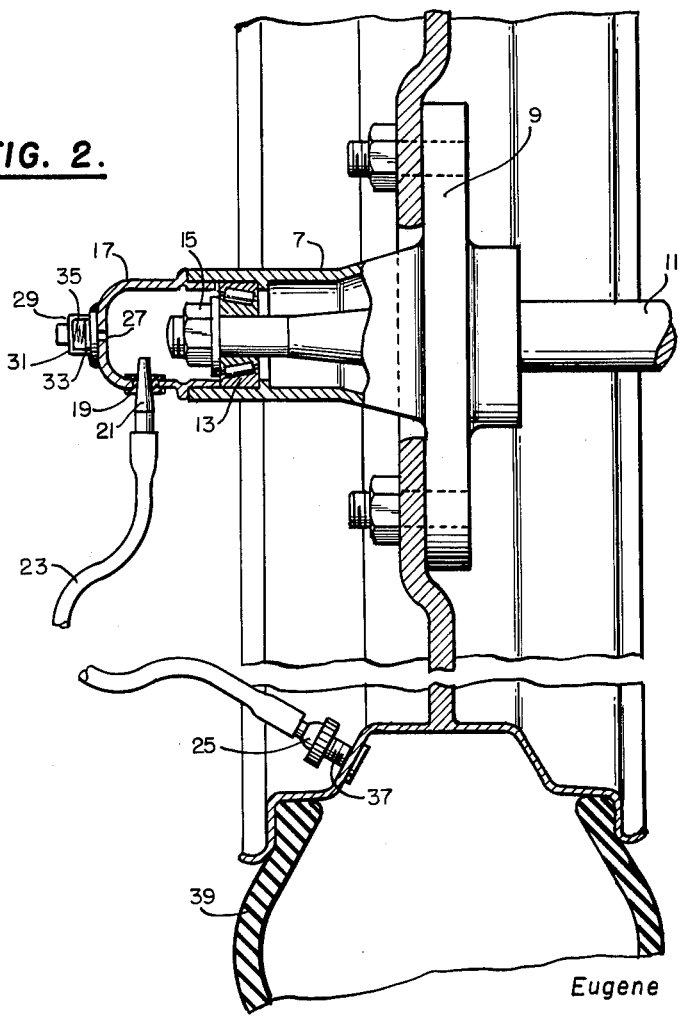

In the drawing:
FIGURE 1 is a perspective view of my invention mounted on the wheel of a conventional trailer.
FIGURE 2 is a cross-sectional view through the center of the wheel and hub shown in FIGURE 1.

Referring more particularly to the drawing, a conventional boat 1 is shown in FIGURE 1 mounted on a conventional trailer 3 which is supported by wheels 5.

In FIGURE 2 is shown a conventional wheel hub 7, the hub flange 9, and the axle 11 upon which the hub is mounted. A front wheel bearing 13 is shown mounted between the hub 7 and the axle 11. A rear wheel bearing (not shown) is likewise mounted between the axle 11 and the hub 7. A nut 15 is shown screwed onto the outer end of the axle or spindle 11 to hold the hub and the wheel bearing in position. Fitted over the exterior open end of the hub 7 is a hub cap or dust cover 17.

During loading or unloading operations of the boat 1, the trailer 3 is generally backed into the water until the wheels 5 are submerged, or nearly so, and the water is above the axle 11 and hub cap or dust cover 17. It is during this loading and unloading operation that water, and particularly salt water, has an opportunity to find its way into the interior of the hub 7 and to mix with the grease or other lubricant used on the bearings 13. When this happens, these bearings 13 must be removed, thoroughly cleaned with kerosene or the like and repacked with new lubricant. If one fails to do this, the result is permanent damage to the bearings 13, necessitating the purchase of new bearings.

To provide a positive and inexpensive means of preventing the entry of water, and particularly salt water, during loading and unloading operations I provide an opening 19 drilled in the hub cap or dust cover 17. This opening, 19, receives a stem 21 attached to a flexible hose member or conduit 23 which has secured on its other end a screw cap member or connecting means 25.

I further provide a small opening 27 drilled or punched in the face of the hub cap or dust cover 17. Soldered or otherwise affixed over this opening 27 I provide a small check valve 29.

The check valve 29 consists of an open frame 31 which covers and contains a small sealing washer 33 which is held in place over the opening 27 by a small spring 35.

Within the cap member 25 is a small pin or depressant (not shown) which forces the valve pin (not shown) within the tire valve stem 37 down as it is screwed on so as to allow air under pressure to escape into the hose member 23 and thence into the interior of the hub cap or dust cover 17.

The cap member 25, operates as an air metering control since air is allowed to escape at a rate determined by the extent it is screwed down on the valve stem 37.

In operation, as the cap member 25 is screwed down on the valve stem 37 to release air from the tire 39 and thence through the hose 23 to the hub cap 17, an increase in air pressure or pressure build-up is effected within the cover 17 and hub 7 above atmospheric air pressure. As this pressure build-up is increased a force is exerted by the air pressure within the cap 17 against the face of the washer 33 and the spring 35. As the spring tension of the spring 35 is overcome, the washer 33 is forced out and away from the opening 27 and allows air to escape from within cap 17 through opening 27. This escaping air prevents the entry of water through the opening 27 and into the hub cap 17 and hub 7 since the pressure of this escaping air is higher than the atmospheric pressure or hydraulic pressure which is acting to force water into said opening and the interior of hub 7. Any other openings at the rear of the hub 7 are likewise sealed off by escaping air which is at a higher pressure than the pressure of the water in which the hub and axle are submerged; thus preventing the entry of any water into the hub 7 and causing damage to the bearings 13.

The operator conducting the loading or unloading operations is, in addition, always able to tell when an effective seal is present by the noise made by the escaping air through the opening 27 and past the check valve 35 and the air bubbles formed when the check valve 35 is submerged. Also, the operator always knows when the proper pressure is present within the hub 7. He merely screws the cap member 25 down on the valve stem 37 until air begins to pass through the opening 27. In practice only a small amount of this air at higher pressure from the tire 39 is necessary to fully accomplish the waterproof sealing purpose. For this reason, an ample supply of such air is always present and available within the tire 39, which acts as a reservoir for such air under pressure.

It is thus obvious that a positive and effective waterproof sealing means, together with an audible and visible signal therefor, is made possible through a simple and inexpensive, yet always positive acting device.

Having thus described my invention, I claim:
1. In combination, waterproof sealing means for vehicle wheel hubs comprising: a hub cap enclosing the end of a wheel hub, a conduit, said conduit being connected to a tire valve stem, means operable to depress a valve in said valve stem to allow air under pressure to enter said conduit and to regulate the flow rate thereof, the other end of said conduit leading to the interior of said wheel hub, a second valve on said hub cap automatically operable to allow air under pressure within said wheel hub to partially escape to an area of lower pressure whereby the interior of said wheel is made waterproof and said partially escaping air acts as a signal that the interior of said wheel hub is in such waterproof condition.

2. In combination, waterproof sealing means for vehicle wheel hubs comprising: a wheel having a hub, a hub cap enclosing the end of said hub, said hub cap having an aperture therethrough, value means covering said aperture, a second aperture, conduit means, one end of said conduit means in said second aperture, connecting means on the other end of said conduit means, said conduit means attached by said connecting means to an air reservoir on said wheel containing air at a higher pressure than atmospheric pressure, depressant means on said connecting means, said connecting means acting to make said depressant means adjustable whereby air under pressure from said reservoir is metered through said conduit means to the interior of said hub.

3. In combination, fluidproof sealing means for vehicle wheel hubs and wheel bearings comprising: a wheel having a hub, a hub cap covering the end of said hub, bearings within said hub, a reservoir on said wheel containing air under pressure greater than atmospheric pressure, a conduit connecting said reservoir to the interior of said hub, valve means operable to release said air from said reservoir into said conduit and into contact with said bearings, second valve means automatically allowing said air under pressure to be partially released from said hub and bearings whereby fluid other than said air under pressure and outside of said hub is prevented from coming into contact with said bearings.

References Cited by the Examiner

UNITED STATES PATENTS

| | | | |
|---|---|---|---|
| 988,533 | 4/1911 | Zervina | 152—415 X |
| 1,734,348 | 11/1929 | Rouch | 152—417 X |
| 2,931,414 | 4/1960 | Jankowski | 152—417 |
| 3,003,834 | 10/1961 | Pendleton. | |
| 3,044,567 | 7/1962 | Reed. | |
| 3,102,737 | 9/1963 | Williams | 280—414 |

FOREIGN PATENTS 801,802   9/1958   Great Britain.

BENJAMIN HERSH, *Primary Examiner.*

ARTHUR L. LA POINT, *Examiner.*

R. J. JOHNSON, *Assistant Examiner.*